(12) United States Patent
Beeckman et al.

(10) Patent No.: US 7,572,749 B2
(45) Date of Patent: Aug. 11, 2009

(54) STRUCTURED BODIES WITH SILICEOUS BINDER

(75) Inventors: Jean W. Beeckman, Columbia, MD (US); Glenn R. Sweeten, East Stroudsburg, PA (US); Arthur W. Chester, Cherry Hill, NJ (US); John P. McWilliams, Woolwich, NJ (US); Dominick N. Mazzone, Wenonah, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 564 days.

(21) Appl. No.: 11/189,665

(22) Filed: Jul. 26, 2005

(65) Prior Publication Data
US 2006/0052233 A1 Mar. 9, 2006

Related U.S. Application Data

(60) Provisional application No. 60/606,007, filed on Aug. 31, 2004.

(51) Int. Cl.
*B01J 29/06* (2006.01)

(52) U.S. Cl. .............................. 502/60; 502/63; 502/64; 502/69; 502/159; 502/208; 502/214; 502/439

(58) Field of Classification Search ................... 502/60, 502/63, 64, 69, 159, 208, 214, 439
See application file for complete search history.

(56) References Cited

U.S. PATENT DOCUMENTS

| 3,090,691 | A | | 5/1963 | Weyer ......................... 106/39 |
| 4,582,815 | A | | 4/1986 | Bowes ......................... 502/64 |
| 4,637,995 | A | * | 1/1987 | DeAngelis et al. .......... 502/439 |
| RE34,804 | E | | 12/1994 | Lachman et al. ............. 502/64 |
| 5,492,883 | A | | 2/1996 | Wu ............................ 502/439 |
| 5,565,394 | A | * | 10/1996 | Lachman et al. ............. 502/64 |
| 5,633,217 | A | | 5/1997 | Lynn ......................... 502/439 |
| 6,214,758 | B1 | * | 4/2001 | Wu et al. ...................... 502/64 |

FOREIGN PATENT DOCUMENTS

| DE | 37 38916 A1 | 5/1989 |
| DE | 19 815564 A1 | 10/1999 |
| JP | 2002 271713 | 4/2004 |
| WO | 00/72966 A1 | 12/2000 |
| WO | 03/092887 A1 | 11/2003 |

* cited by examiner

*Primary Examiner*—Elizabeth D Wood

(57) ABSTRACT

The invention relates to the use of particulate silicone resins in the absence of added organic solvents with particulate inorganic materials to form structured bodies and in particular molecular sieve containing structured bodies. The silicone resin is used in the form of a particulate with an average particle size of less than 700 um. Upon calcining, the silicone resin is converted to silica which acts as a binder.

10 Claims, No Drawings

STRUCTURED BODIES WITH SILICEOUS BINDER

CROSS-REFERENCE TO RELATED APPLICATION

This application claims benefit of U.S. Provisional Patent Application Ser. No. 60/606,007 filed Aug. 31, 2004.

FIELD OF THE INVENTION

The present invention relates to structured bodies, compositions for their manufacture, and to methods for manufacturing such structured bodies. In particular, the present invention relates to organic solvent free compositions and processes for their use in the manufacture of organic solvent free extrudates of inorganic particulate materials and their calcined products.

BACKGROUND OF THE INVENTION

Bodies made of particulate inorganic materials such as ceramic materials, activated carbon and molecular sieves, are used in a wide variety of applications such as catalysts, supports for catalysts and adsorption media. One of the most common methods of manufacturing these bodies is by forming the body from a plasticized mixture. The plasticized mixture typically consists of a mixture of the respective inorganic material, usually in particulate form such as a powder, with binders, etc., carried in a suitable vehicle. The vehicle is typically a solvent such as water, organic solvent or mixtures thereof. The bodies are shaped using various methods dried and often heat-treated using such methods as calcination.

A particularly important class of structured bodies is those comprising molecular sieve like materials. Molecular sieve materials for use in catalytic and other applications are, for various reasons, rarely utilized in their as synthesized form. Usually such molecular sieve materials are formulated into compositions with other materials such as inorganic or organic binders and other co-active components to enable the molecular sieve to be formed into a support structure or catalyst structure. Typically this catalyst composition is formed into three-dimensional structures such as, for example, extruded pellets or more complicated structures such as extruded honeycombs. Various high surface area oxides such as alumina, titania, spinel, zirconia, silica, and the like, are known in the art as being extrudable into high strength supports, such as honeycomb structures used for filters or used for catalyst supports and for being extrudable as catalyst pellets. Some of these materials such as the amorphous silicas are relatively difficult to extrude. Molecular sieve materials such as, for example, zeolites or mesoporous crystalline silica materials have not been readily available in extruded form or have been extruded with some difficulties and limitations.

Molecular sieve materials require careful formulation with binders and other additives to form compositions that are readily formable, for example, by extrusion, to prepare molecular sieve structures. However, despite this care, the final molecular sieve structures may exhibit certain deficiencies and problems as a consequence of the composition and/or the forming method used. These problems are often due to the need to use high levels of organic or inorganic binder in combination with solvents to extrude the molecular sieve structures. The resultant structures, after calcination, contain binder residue or damage due to the manufacturing process. In addition the high levels of binder result in extruded structures that contain reduced levels of active molecular sieve material. A further difficulty is in providing extruded molecular sieve structures that have sufficient compressive strength. Acceptable compressive strength is important to ensure that the molecular sieve structures remain intact and retains their activity during use. If these structures are of insufficient strength, they may deteriorate quicker in use and require replacement at more frequent intervals; this may have significant detrimental effects on the economics of the processes in which they are used. A further requirement with extruded molecular sieve structures is that they have sufficient green strength on extrusion to enable ease of handling. A further problem is that the final extruded molecular sieve structure may have reduced or modified activity, which is due to the unavoidable presence of co-extruded binders that affect the effective catalytic activity during use. One particular class of molecular sieve materials that suffers from this problem is the high Si/Al ratio nanoporous materials that are normally extruded with caustic/colloidal silica binders to produce high silica content extrudates, such as those described in U.S. Pat. No. 4,582,815. In these extrudates the binder causes damage to the inherent structure of the molecular sieve. One of these deficits is the significant loss of surface area of the molecular sieve crystal or mesoporous material under these high pH conditions. The high surface area mesoporous crystalline aluminosilicates and silicates designated as M41S, such as MCM-41 and MCM-48, have been particularly difficult to extrude as molecular sieve structures with high strengths using conventional extrusion techniques.

Further to the above-identified problems, there are also difficulties associated with solvent-based systems. There are OSHA concerns (toxicity and flammability) due to the presence of strong organic solvent vapor during mixing and extrusion. There are also difficulties associated with drying when solvent is used in the manufacture of the extruded material. Under normal drying in an electrically heated oven, volatile solvents tend to cause blistering and cracking of such molecular sieve structures due to a rapid forming of dry skin over the substrates. To minimize the occurrence of such problems, the structures are generally dried at very slow rates in a ventilating hood over a period of several days. The slow drying is due to the tendency of such structures to rapidly form a dry skin over the substrate from the volatile substrate, which also causes blistering and cracking when such structures are subjected to drying. As a result, molecular sieve structures formed from solvent-containing batches require slow drying in a ventilating hood, typically over a period of days to minimize the occurrence of blisters and cracks.

In U.S. Pat. No. 5,633,217, zeolite honeycomb extrudates are manufactured using silicone resins as a permanent binder. As disclosed in this reference, except for silica, precursors of the permanent binder may be used in the form of a dispersion, suspension, or solution in a liquid diluent. When the precursor for the permanent binder is a silicone resin, the resin is dissolved in an organic solvent or a mixed organic solvent system of alcohol and water. The silicone resin may be mixed directly with porous oxide powders, in which case a solvent is used during the plasticizing step to dissolve the resin. Alternatively, the silicone resin may be pre-dissolved in an appropriate organic solvent such as methyl alcohol, ethyl alcohol and isopropyl alcohol. Whether the silicone resin is pre-dissolved in a solvent or mixed directly with the porous oxide powders, followed by the addition of solvent, the resins may be milled. In this reference, it is taught that the use of organic solvent is essential in order to achieve an extruded monolith with acceptable flexural strength. In Example 2 (Comparative) of U.S. Pat. No. 5,633,217, Dow Corning 6-2230 silicone resin was used in the form of flakes; these are known to be of particle size in excess of 1 mm. In this Example, the resin was used without organic solvent to form an extruded rod, which had a reported flexural strength of less than 100 psi; this was described as a low flexural strength.

U.S. Pat. No. 5,492,883 offers the possibility of reducing the levels of organic solvent used in the manufacture of extruded molecular sieve structures. In this reference, zeolite extruded structures are prepared using an aqueous emulsion of silicone resin. The emulsions typically contain silicone particles of the order of 700 nm particle size and also contain 60 wt. % resin solids. However, the emulsions also contain 0.5 to 1 lb/gal of aromatic solvents. This indicated level of solvent is described as low in this reference. However, the present environmental standards dictate that this level of organic solvent is, in many instances, an unacceptably high level.

Acceptable green strength is important in order to enable ease of handling of extrudates during their manufacture and, in addition, to ensure that the extrudate maintains its shape and does not collapse or deform under its own weight during the manufacturing process. Extrudates prepared using organic solvent-based compositions are known to have poor green strength and to be easily deformed after extrusion. Therefore, there is a need for alternative and more flexible methods for the manufacture of structured bodies and, in particular, formed molecular sieve structures without the use of organic solvents.

SUMMARY OF THE INVENTION

Thus, in a first aspect, the present invention provides a method of forming structured bodies and, in particular, extruded molecular sieve structures using silicone resins in particulate form without the addition of organic solvents. In particular, the process of the present invention provides a crack-free, extruded structured body, especially a molecular sieve structured body, formed by (1) providing a batch composition containing particulate inorganic material, silicone resin of average particle size less than 700 um, and optionally an extrusion aid, and water; (2) forming the batch composition into a structured body; (3) optionally drying the structured body; and (4) optionally firing the structured body at a temperature and for a duration of time sufficient to form a structured body of good strength. The process of the present invention is generally applicable to the manufacture of structured bodies and, in particular, structured bodies comprising molecular sieve.

The present invention therefore provides a process for the manufacture of a structured body, which process comprises:

(a) preparing a batch composition free of added organic solvent comprising mixing at least one particulate inorganic material, at least one particulate silicone resin of average particle size 700 um or less, and water, and (b) forming the batch composition into a structured body.

In a preferred embodiment, the formed structured body is dried. It is also preferred that the structured body is calcined with or without drying before calcination. It is further preferred that the forming of step (b) is undertaken by extrusion. In a preferred embodiment, the particulate inorganic material is a one or more molecular sieve.

In a further aspect, the present invention provides for a composition suitable for forming into a structured body, which composition is free of added organic solvent, and comprises at least one particulate inorganic material, at least one particulate silicone resin of average particle size 700 um or less, and water. The composition preferably contains from 0.5 to 99.5 wt. % based on solids of particulate inorganic material and 99.5 to 0.5 wt. %, based on solids of silicone resin. Water is added in an amount sufficient to make the solid mixture of particulate inorganic material and silicone resin extrudable. The particulate inorganic material may be amorphous or crystalline. Crystalline materials may be zeolitic or mesoporous.

In a further aspect, the present invention provides a formed structured body free of added organic solvent in the green state, which comprises at least one particulate inorganic material, at least one particulate silicone resin of particle size less than 700 um and water, and which formed structure has sufficient green strength for handling without deformation. Preferably the inorganic material is a one or more molecular sieve. A preferred class of molecular sieve is one having $SiO_2/Al_2O_3$ ratios of 10 or greater.

In a further aspect, the present invention provides a formed structured body, which comprises at least one particulate inorganic material, 10 wt. % or less of at least one silicone resin derived silica binder, and a crush strength of greater than 35 lb/in. Preferably the inorganic material is a one or more molecular sieve. A preferred class of molecular sieve is one having $SiO_2/Al_2O_3$ ratios of 10 or greater.

In a further aspect, the present invention provides a process for treating or converting a feed containing hydrocarbon and/or non-hydrocarbon compounds, which process comprises contacting the feed containing hydrocarbon and/or non-hydrocarbon compounds with one or more structured bodies according to the present invention or as provided by the process for the manufacture of structured bodies according to the present invention.

DETAILED DESCRIPTION OF THE INVENTION

In the conventional prior art method of forming structured bodies such as catalysts, the catalytic material and any resin binder are mixed with organic solvent to make a composition suitable for forming into the finished catalyst. According to the present invention, there is provided a process for the manufacture of structured bodies and, in particular, structured bodies comprising molecular sieve structures that have relatively low levels of inorganic binder and which have been manufactured without the addition of organic solvents. By use of the term "free of added organic solvent" or "free of organic solvent", it is intended that present composition either contain no added organic solvent, or that if amounts of organic solvents are present in the composition, they are present in such minor amounts that their presence will not adversely affect the integrity of the silica binder formed upon calcination. The amount of solvent, which any given composition may tolerate, is determined by comparing the physical properties, especially the crush strength, of the silica bound composition with and without the organic solvent. It is preferred that no organic solvent be added to the composition.

The present invention uses water instead of added organic solvents in the manufacturing process. Preferably they have been manufactured in the absence of additional organic binders. The resultant green body structures obtained from the process have surprisingly high green strengths and contain binders that, after calcination, have little or no detrimental effect on the properties of the particulate inorganic material, especially when the particulate inorganic material comprises molecular sieve or catalyst derived from molecular sieve. The process of the present invention has been found to be particularly suitable for the preparation of molecular sieve extrudate structures based on molecular sieve materials that have been synthesized using amphiphilic compounds as hereinafter described and especially high silica/alumina ratio nanoporous materials, especially the high surface area mesoporous aluminosilicate and silicate materials designated as M41S silica materials such as, for example, MCM-41 and MCM-48.

An important aspect of the process of the present invention is the use of a silicone resin of defined average particle size. The use of a silicone resin in this form enables the particulate inorganic material to be extruded without the use of high levels of additional organic or undesirable inorganic binder materials, with the minimal amount necessary of organic extrusion aids and importantly without the use of added organic solvents. This enables green extrudates of high strength to be produced. This approach also enables structured bodies comprising molecular sieve to be produced, which have high contents of active catalytic material (90 wt. % or greater) and which have high compressive strengths after calcination. The silicone resin of defined average particle size is converted in-situ to a silica binder upon calcination. The resultant calcined structured body contains particulate inorganic material in the presence of a primarily non-acidic silica binder, which is highly desirable for many applications especially where the structured body comprises one or more molecular sieve materials.

The silicone resin is used in particulate form as opposed to an emulsion, or a solution, or in the form of flakes. The particulate silicone resin has an average particle size of 700 μm or less, preferably 600 μm or less. In a preferred embodiment, the average particle size of the particulate silicone resin is within the range of 0.01 to 700 μm, preferably 0.02 to 600 μm and most preferably within the range of 0.1 to 450 μm. Ideally, the minimum particle size will be at least 2, preferably at least 5 and more preferably at least 10 μm and most preferably at least 25 μm. Preferred particulate silicone resins are those that remain solid at room temperature, ambient temperature or below the forming temperature used to prepare the structured bodies, e.g., below the extrusion or compression molding temperature. Also preferred are silicone resins that have a softening point such that under the selected pressures and temperatures of forming, e.g., extrusion or compression molding, they melt or flow or are able to coalesce. Ideally, and preferably, the silicone resin re-solidifies on cooling after extrusion or compression molding.

The silicone resin can be a single silicone resin or a combination of silicone resins which meet the above criteria. Silicone resins are polysiloxanes containing a repeating silicon-oxygen backbone and organic groups attached to a proportion of the silicon atoms by silicon-carbon bonds. The molecular structure of silicones may include linear, branched and/or cross-linked structures. Silane monomers are the precursors of silicones and the nomenclature of silicones makes use of the letters M, D, T and Q to represent monofunctional, difunctional, trifunctional and quadrifunctional monomer units. Primes, e.g., D' are used to indicate substituents other than methyl. Examples of formulas and their corresponding symbols for silicones are provided in Table 1.

TABLE 1

| Formula | Functionality | Symbol |
| --- | --- | --- |
| $(CH_3)_3SiO_{0.5}$ | Mono | m |
| $(CH_3)_2SiO$ | Di | D |
| $(CH_3)SiO_{1.5}$ | Tri | T |
| $(CH_3)(C_6H_5)SiO$ | Di | D' |
| $(CH_3)(H)SiO$ | Di | D' |
| $SiO_2$ | Quadri | Q |

Particularly preferred silicone resins are the polysiloxanes with alkyl and/or aryl and/or glycol groups. The alkyl groups preferably include 1 to 12 carbons, and most preferably include 6 to 10 carbons. The preferred resins are cross-linkable silicones containing reactive silanol groups. Examples of suitable silicone resins are those that originate from methyl hydrogen polysiloxane and phenyl methyl polysiloxanes.

Preferred silicone resins have a silicon oxide content of at least 50% by weight and a degree of cross-linking of 1.5 or less preferably 1.3 or less, and most preferably 1.2 or less. Preferred silicone resins have a viscosity at room temperature of at least 20 centipoise (60% solids in toluene), more preferably at least 30 centipoise and most preferably at least 50 centipoise. Preferred silicone resins have a weight average molecular weight within the range of 1000 to 10,000, preferably 2000 to 7000, and most preferably, 2000 to 4000. Preferred silicone resins have a silanol content of at least 3 wt. % and most preferably at least 5 wt. %. Particularly preferred because of its high reactivity are silicones such as Q6-2230 silicone resin manufactured by Dow Corning and sometimes referred to as Dow Corning® 233 flake resin.

For further details of suitable silicone resins, reference should be made to *Kirk-Othmer Concise Encyclopaedia of Chemical Technology*, John Wiley & Sons, Inc., New York 1985, pages 1062-1065, the disclosure of which is incorporated herein by reference in its entirety. Other suitable silicone resins are described in U.S. Pat. No. 3,090,691, the disclosure of which is incorporated herein by reference in its entirety.

The preferred silicone resins are typically manufactured as flakes. These, and other unsuitable forms of the silicone resin, may be converted to the desired average particle size by milling and other similar processes such as hammer milling and or jet pulverization. One example of an alternative process is melting of the resin followed by spraying of the melted resin to form droplets of the required particle size. Using this method the resin may be introduced, in particulate form, directly into a mixing unit prior to forming of the structured body.

The particulate silicone resin may be dry blended with the particulate inorganic material. Prior to extrusion and calcination, the mixture of silicon resin and particulate inorganic material contains from 40 to 99.5 wt. %, based on solids of particulate inorganic material and 60 to 0.5 wt. % silicone resin, based on solids, preferably from 90 to 99.5 wt. % particulate inorganic material and from 0.5 to 10 wt. % silicone resin. Water is added in an amount sufficient to make the solid mixture of particulate inorganic material and silicone resin extrudable. The amount of water needed to form an extrudable mixture is typically between 75 and 20 wt. %, based on extrudable mixture. The particulate inorganic material and silicone resin are preferably added to the extrusion mixture in an amount such that, after extrusion and calcination, the extrudate contains from 50 to 99.5 parts by weight (wt. %) particulate inorganic material and from 0.5 to 50 parts by weight (wt. %) silica. Preferably, the extrudate contains from 75 to 95 parts by weight (wt. %) particulate inorganic material and from 5 to 25 parts by weight (wt. %) silica. More preferably, the extrudate contains from 80 to 95 parts by weight (wt. %) particulate inorganic material and from 5 to 25 parts by weight (wt. %) silica and most preferably the extrudate contains from 90 to 95 parts by weight (wt. %) particulate inorganic material and from 5 to 10 parts by weight (wt. %) silica.

There are a wide variety of particulate inorganic materials and mixtures of particulate inorganic materials that may be utilized in the processes and structures of the present invention. The particulate inorganic materials may be amorphous or crystalline. Examples of these amorphous and crystalline particulate materials include carbon, cordierite, mullite, clay, talc, zircon, zirconia, spinel, aluminas and their precursors, silicas, silicates, aluminates, lithium aluminosilicates, alumina silica, feldspar, titania, fused silica, nitrides, e.g. silicon nitride, carbides, e.g., silicon carbide, borides, metal oxides and molecular sieves or mixtures of these. Molecular sieve materials may be zeolitic or mesoporous. Metal oxides may be bulk metal oxides such as those disclosed in U.S. Pat. No. 6,162,350, which is incorporated herein by reference in its entirety. Carbon-type supports are commercially available in a wide variety of surface areas and ash contents.

In this specification, the term "molecular sieve" refers to crystalline substances or structures having pore sizes suitable for adsorbing molecules. The term is generally used to describe a class of materials that exhibits selective absorption properties. Molecular sieves typically separate components of a mixture on the basis of molecular size and shape differences. There is a wide range of such materials available in the art. All of the molecular sieves described in the following paragraphs may be used as the molecular sieve component of the present invention. Such materials include silicates, the metallosilicates, metalloaluminates, the $AlPO_4$, silico- and metalloaluminophosphates, zeolites, and mesoporous silicas such as M41S and MCM-41, and others materials as described in R. Szostak, "Molecular Sieves: Principles of Synthesis and Identification," pages 2-6 (*Van Nostrand Reinhold Catalysis Series,* 1989), the disclosure of which is incorporated herein by reference in its entirety. The following is a non-exhaustive list of some of the molecular sieve materials which may be used as the particulate inorganic material in the present invention; Hyper Y, USY zeolite, faujasite, zeolite type L, mazzite, EMC-2, MAPO-36, AlPO4-5, AlPO4-8, VPI-5, zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), ZSM-5 (U.S. Pat. Nos. 3,702,886, 4,797, 267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), zeolite ZSM-20 (U.S. Pat. No. 3,972,983), ZSM-35 (U.S. Pat. No. 4,016,245); ZSM-22 (U.S. Pat. No. 5,336,478), zeolite ZSM-23 (U.S. Pat. No. 4,076,842), ZSM-34 (U.S. Pat. No. 4,086,186), ZSM-35 (U.S. Pat. No. 4,016,245), ZSM-48 (U.S. Pat. No. 4,397,827), ZSM-58 (U.S. Pat. No. 4,698,217), zeolite beta (U.S. Pat. No. 3,308,069), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619, 818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236, 575), MCM-56 (U.S. Pat. No. 5,362,697), AlPO-11 (U.S. Pat. No. 4,310,440), titanium aluminosilicates (TASO), TASO-45 (EP-A-0 229,-295), boron silicates (U.S. Pat. No. 4,254,297), titanium aluminophosphates (TAPO) (U.S. Pat. No. 4,500, 651), mixtures of ZSM-5 and ZSM-11 (U.S. Pat. No. 4,229, 424), ECR-18 (U.S. Pat. No. 5,278,345) and SAPO-11 (U.S. Pat. No. 4,440,871).

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities, which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties. When zeolites are used as the molecular sieve in the present invention, it is preferred that they are used in the template free state.

Such molecular sieves, both natural and synthetic, include a wide variety of positive ion-containing crystalline silicates. These silicates can be described as a rigid, three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and Group IVA element, e.g., silicon, atoms to oxygen atoms is 1:2. The Periodic Table of the Elements is that set forth in the *CRC Handbook of Chemistry and Physics,* 65th Edition. The electrovalence of the tetrahedra containing the Group IIIA element, e.g., aluminum, is balanced by the inclusion in the crystal of a cation, for example, an alkali metal or an alkaline earth metal cation. This can be expressed wherein the ratio of the Group IIIA element, e.g., aluminum, to the number of various cations, such as $Ca^{+2}$, $Sr^{+2}$, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865; and 4,104,294 describe crystalline silicate of varying alumina and metal content.

A further class of molecular sieve, which may be used in the present invention, are the metalloaluminophosphate molecular sieves. These have been described in detail in numerous publications including, for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where E1 is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 ($AlPO_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554, 143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500, 651, 4,551,236 and 4,605,492 (TiAPO), U.S. Pat. Nos. 4,824, 554, 4,744,970 (CoAPSO), U.S. Pat. No. 4,735,806 (GaAPSO) EP-A-0 293 937 (QAPSO, where Q is framework oxide unit [QO$_2$]), as well as U.S. Pat. Nos. 4,567,029, 4,686, 093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other metalloaluminophosphate molecular sieves include those described in EP-0 888 187 B1 (microporous crystalline metallophosphates, SAPO$_4$ (UIO-6)), U.S. Pat. No. 6,004, 898 (molecular sieve and an alkaline earth metal), U.S. patent application Ser. No. 09/511,943 filed Feb. 24, 2000 (integrated hydrocarbon co-catalyst), PCT WO 01/64340 published Sep. 7, 2001 (thorium containing molecular sieve), and R. Szostak, *Handbook of Molecular Sieves*, Van Nostrand Reinhold, New York, N.Y. (1992), which are all herein fully incorporated by reference.

When present, the metal may be an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIIB, VIIB, VIII, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof.

The metalloaluminophosphate molecular sieve may be represented by the empirical formula, on an anhydrous basis:

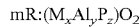

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIIB, VIIB, VIII and Lanthanide's of the *CRC Handbook Periodic Table of Elements*, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO and ALPO molecular sieves of the invention include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred metalloaluminophosphate molecular sieves include one or a combination of SAPO-18, SAPO-34, SAPO-35, SAPO-44, SAPO-56, ALPO-18 and ALPO-34, even more preferably one or a combination of SAPO-18, SAPO-34, ALPO-34 and ALPO-18, and metal containing molecular sieves thereof, and most preferably one or a combination of SAPO-34 and ALPO-18, and metal containing molecular sieves thereof.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., "Zeolites: Facts, Figures, Future", *Elsevier Science Publishers B. V.*, 1989, present work showing cacoxenite as being very hydrophilic, i.e., adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. No. 3,355,246 (i.e., ZK-21) and U.S. Pat. No. 3,791,964 (i.e., ZK-22). Other teachings of silicoaluminophosphates and their synthesis include U.S. Pat. No. 4,673,559 (two-phase synthesis method); U.S. Pat. No. 4,623,527 (MCM 10); U.S. Pat. No. 4,639,358 (MCM-1); 4,647,442 (MCM-2); U.S. Pat. No. 4,664,S97 (MCM-4); U.S. Pat. No. 4,638,357 (MCM-5); and U.S. Pat. No. 4,632, 811 (MCM-3).

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminium-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228, 036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All zeolite molecular sieves discovered to date have pore sizes in the microporous range, which is usually quoted as 2 to 20 Angstroms, with the largest reported being about 12 Angstroms.

A preferred class of zeolites for use in the present invention are the "high-silica zeolites". This refers to those zeolites having a $SiO_2/Al_2O_3$ molar ratio that is 10 or more, and for some applications very high ratios of 100 or greater. Molecular sieve materials with any silica/alumina ratio may be used in this invention, however, it is preferred to use high or very high silica/alumina ratio for thermal stability. Preferred $SiO_2/Al_2O_3$ molar ratios for use in the present invention are in excess of 100, preferably in excess of 200 and most preferably in excess of 300.

A separate class of molecular sieve materials, which may be used in the present invention, and which are highly preferred, are those materials that may be synthesized using amphiphilic compounds as directing agents. Examples of such materials are described in U.S. Pat. No. 5,250,282, the whole content of which is hereby incorporated by reference. Examples of amphiphilic compounds are also provided in Winsor, *Chemical Reviews*, 68(1), 1968. Other suitable molecular sieve materials of this type are described in "Review of Ordered Mesoporous Materials," U. Ciesla and F. Schuth, "Microporous and Mesoporous Materials," 27, (1999), 131-49. Such materials include but are not limited to materials designated as SBA (Santa Barbara) such as SBA-2, SBA-15 and SBA-16, materials designated as FSM (Folding Sheet Mechanism) such as FSM-16 and KSW-2, materials designated as MSU (Michigan State) such as MSU-S and MSU-X, materials designated as TMS or Transition Metal Sieves, materials designated as FMMS or functionalized monolayers on mesoporous supports and materials designated as APM or acid prepared mesostructure. Particularly preferred molecular sieve materials of this class are the silicate or aluminosilicate mesoporous molecular sieves designated as M41S such as MCM-1, MCM-2, MCM-3, MCM-4, MCM-5, MCM-9, MCM-10, MCM-14, MCM-22, MCM-41, MCM-48, MCM-49, and MCM-56. These molecular sieves are described in detail in U.S. Pat. No. 5,102,643, the whole content of which is hereby incorporated by reference. A particularly suitable subclass of this family of materials for use in the present invention are the mesoporous silicas known as MCM-41 and MCM-48. MCM-41 is particularly preferred and has a hexagonal arrangement of uniformly sized mesopores. MCM-41 molecular sieve materials are described in detail in U.S. Pat. No. 5,098,684, the whole content of which is hereby incorporated by reference. The MCM-41 molecular sieves generally have a $SiO_2/Al_2O_3$ molar ratio when alumina is present and it is preferred that the $SiO_2/Al_2O_3$ molar ratio for these materials is greater than 100, preferably greater than 200, and most preferably greater than 300. In a particularly preferred embodiment the MCM-41 molecular sieve consists of mesoporous silica. The inorganic mesoporous molecular sieve materials for use in the present invention preferably have the following composition:

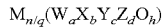
$$M_{n/q}(W_aX_bY_cZ_dO_h)$$

wherein W is a divalent element, such as a divalent first row transition metal, e.g., manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIA ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the preferred mesoporous molecular sieve materials for use in this invention have a composition, on an anhydrous basis, expressed empirically as follows:

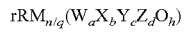
$$rRM_{n/q}(W_aX_bY_cZ_dO_h)$$

wherein R is the total organic material not included in M as an ion, and r is the coefficient for R, i.e., the number of moles or mole fraction of R. The M and R components are associated with the material as a result of their presence during crystallization, and are easily removed or, in the case of M, replaced by post-crystallization methods hereinafter more particularly described.

To the extent desired, the original M, e.g., ammonium, sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g., ammonium, ions and mixtures thereof. Particularly preferred ions are those which tailor the catalytic activity for certain hydrocarbon conversion reactions. These include hydrogen, rare earth metals and metals of Groups IA (e.g., K), IIA (e.g,. Ca), VIIB (e.g., Mn), VIII (e.g., Ni), IB (e.g., Cu), IIB (e.g., Zn), IIIA (e.g., In), IVA (e.g., Sn), and VIIA (e.g., F) of the Periodic Table of the Elements (*CRC Handbook of Chemistry and Physics*, 65th Edition) and mixtures thereof.

The term "mesoporous" is used herein to indicate crystals having uniform pores within the range of from about 1.3 nm to about 35 nm. The preferred mesoporous molecular sieves for use in this invention will have uniform pores within the range of from about 1.3 nm to about 35 nm, more usually from about 1.5 nm to about 20 nm, and preferably from 2 nm to 10 nm.

In addition to the molecular sieve, it is also possible to include other inorganic materials within the batch composition and the resultant structured body. Other inorganic materials may be used to effectively dilute and therefore control the amount of active molecular sieve material present in the structure body. These inorganic diluents may be inert or may be catalytically active. Examples of suitable inorganic diluent materials are the non-molecular sieve particulate inorganic materials identified above especially particulate inorganic oxides such as alumina or silica or the like or precursors to these materials such as Na-silicate and Al-nitrate. In this mode of use, the particulate inorganic oxides are not acting as binder materials but are primarily acting as bulk diluents although the material may still exert some binding function. In the structured bodies of the present invention, the binder function is primarily performed by the particulate silicone resin. When used as diluents for structured bodies comprising molecular sieves, the particulate inorganic materials may be present at the desired level to achieve the requisite dilution of molecular sieve in the structured body. Ideally the amount of diluent material is within the range of 10 to 90 wt % of the combined weight of diluent and molecular sieve material in the structure. Preferably, the diluent is present as 10 to 50 wt. %, and more preferably 20 to 50 wt. % of the combined weight with molecular sieve in the structured body. The inorganic material may also or alternatively function as an aid to mass transport into and within the structured body. This will be especially evident when the inorganic material has large pores and high levels of porosity.

The general methods for producing structured bodies and in particular structured bodies comprising molecular sieve are well known to persons skilled in the art. Such methods generally include the steps of mixing batch materials, which have as their main constituents particulate inorganic material and binder, blending the mixture, forming or shaping the batch into a green body, drying, and subsequently calcining the green body to form a hard porous structure. Usually the forming is undertaken via extrusion or via other methods that require the application of pressure and/or heat such as compression molding. In the present invention extrusion is the preferred method of forming. Also, it is customary to add such additives as lubricants, extrusion aids, plasticisers, and burnout agents (e.g., graphite) to the batch during the mixing step which may be needed to control such properties as viscosity of the batch. The binders may be inorganic, organic or a combination of the two. Organic binders are temporary binders because they are removed during heat-treating such as calcination. These temporary organic binders are plasticizing organic binders that may also assist in maintaining the green strength of the structured body extrudate after extrusion. It is a feature of the present invention that there is no requirement for the use of organic binders, which are optional, as the extruded products of the present invention have sufficient green strength without the need for added organic binder. It is preferred that the structured body in the green form as provided in the present invention is free of organic binder and that the formed and calcined structured body is also free of organic binder residues. In addition to raw materials, porosity is also dependent on the firing temperature. The higher the firing temperature, the more dense (less porous) the resulting fired structure. The process of the present invention may utilize conventional extrusion procedures and equipment well known to those skilled in the art.

The process of the present invention may utilize an optional extrusion aid. The optional extrusion aid may enhance the plasticity of the mixture. Some examples of suitable extrusion aids include as non-limiting examples, polyacrylonitrile, cellulose or derivatives thereof, phenol/formaldehyde resins, polyfurfuryl alcohol, polyimides, polyesters, polyolefins, acrylic resins, polyvinylalcohol, styrene resins or polycarbonate. Preferred are cellulose or derivatives thereof, polyacrylonitrile, phenol/formaldehyde resins, polyfurfuryl alcohol and polyimides. More preferred is hydrated methyl cellulose. The extrusion aid may be added in an amount of about 0.1 to 15 wt. % of the extrudate mixture, preferably in an amount of from 0.1 to 5 wt. % of the mixture and more preferably in an amount of 0.1 to 3 wt. % and most preferably in an amount of 2 wt. % or less, more preferably 1.5 wt. % or less. The preferred extrusion aid is polyvinylalcohol. Useful examples of polyvinyl alcohols are those available from Air Products, Allentown, Pa., under the designation Airvol, for example, Airvol® 205 (molecular weight 31,000-50,000), and Airvol® 350 (mw 124,000-186,000). Other useful water-soluble binders include polyvinylpyrrolidones such as available from GAF, Linden, N.J., under the designation PVP K-30 (row 40,000) and PVP K-60 (row 160,000). In a preferred embodiment one or more extrusion aids are used.

Although the invention is not limited to any specific composition for extrusion, some especially suitable mixture compositions by weight are; about 25 to 99 wt. % particulate inorganic material, e.g., MCM-41, and about 1 to 75 wt. % silicone resin, preferably 1 to 35 wt. %, with additions, based on the particulate inorganic material and silicone resin, of about 1 to 5 wt. %, preferably about 1 to 2 wt. %, and most preferably about 1.5 wt. % or less, of extrusion aid. Preferably, the composition contains sufficient particulate inorganic material to yield a final calcined structured body having a composition of 40 to 99.5 parts by weight (wt. %) particulate inorganic material and from 0.5 to 60 parts by weight (wt. %) silica, preferably, from 70 to 99.5 parts by weight (wt. %) particulate inorganic material and from 0.5 to 30 parts by weight (wt. %) silica, and more preferably, the extrudate contains from 80 to 99.5 parts by weight (wt. %) particulate inorganic material and from 0.5 to 20 parts by weight (wt. %) silica, more preferably 90 to 99.5 parts by weight (wt. %) particulate inorganic material and from 0.5 to 10 parts by weight (wt. %) silica.

In the process of the present invention, a homogeneous formable composition mixture is made of the particulate inorganic material, silicone resin, optional extrusion aid and water. The mixture components are combined to form a homogeneous or substantially homogeneous mixture without the addition of organic solvent. Normally the dry ingredients are first dry blended, preferably in an intensive mixer, and then combined with the water in an amount to enable the formation of an extrudable mixture. Typically, the water is added to form a mixture that is at least 20 wt % solids, more preferably at least 30 wt % solids and most preferably at least 40 wt % solids by weight, and typically within the range of 20 to 70 wt. % solids, and most preferably 30 to 70 wt. % solids. Conventional mixing equipment, e.g., mix-muller or high shear mixers, may be used. To effect further mixing, the batch can be first extruded through a "noodling" die one or more times. The exact solids content of the composition used will to some degree depend on the properties of the specific materials used in preparing the composition for forming. Adjustments may be made to the indicated solids contents to accommodate variations in the properties of the materials used whilst at the same time maintaining a composition, which may be formed in accordance with the process of the present invention.

The prepared composition mixture is then formed into the desired shape. This may be achieved by the application, with suitable equipment, of pressure and/or heat to the composition mixture. Suitable methods include extrusion and compression molding. Compression molding methods are often used to produce structured bodies in the form of tablets. The preferred method of forming is via extrusion, preferably through a die in a ram, single screw, or twin-screw extruder. Such extrusion techniques are well known in the art. When a twin-screw extruder is used, pre-mixing of the batch by extruding through a noodling die may be omitted. The operating conditions of the extruder in terms of temperature and pressure are controlled to ensure that during the extrusion the particulate silicone resin softens and becomes malleable. Normally the action of extrusion, which is under pressure, will result in sufficient heat being generated in the composition mixture to obtain the requisite temperature to cause the particulate silicone resin to soften and become malleable. If the applied pressure is insufficient to generate the required temperature in the composition mixture during extrusion, then additional heat may be applied to the extrusion barrel and/or extrusion die. If the temperature is too high, then either the extrusion pressure may be reduced or cooling may be applied to the extrusion barrel and/or die or both reduced pressure and cooling may be used.

The formed structured body may take any shape suitable for the desired end use of the structured body such as, for example, a catalyst or for supporting a catalyst such as a catalyst metal, or for adsorption applications. The shape depends on the application. Some typical shapes can be, for example, pellets, tubes, or honeycombs, etc. When the structured body is an extrudate, it is preferably in the form of pellets of a size normally used in the manufacture of catalysts. These are typically cylindrical extrudates that are at least $\frac{1}{32}$ inch in diameter and may be $\frac{1}{16}$ or $\frac{1}{8}$ inch in diameter. The method of this invention is particularly well suited to the preparation of structured bodies in the shape of pellets or discs.

After forming, e.g., by extrusion, the resulting shaped green bodies may be dried to remove the water used in forming the composition mixture. This may be achieved by the use of steam or controlled humidity drying, drying in an electrically heated oven or combinations of these techniques. Ideally, they are dried for a period of 12 hours or more. The drying step is preferably accomplished by placing the structured body in an oven at a temperature in the range of 50° C. to 100° C., most preferably, at a temperature in the range of 90° C. to 100° C. In a preferred embodiment, the drying step is accomplished by placing the structured body in the green state in an electrically heated oven for a period of time sufficient to form a crack-free, self-supporting structure; preferably the structured body in the green state is dried in an electrically heated oven 60 minutes or less.

Following drying the dried structured body may be, and preferably is, calcined. During this stage in the process of the present invention, the silicone resin is converted to silica, which acts as an inorganic binder for the particulate inorganic material in the calcined structured body. For example, the extrudate may be calcined in an oxygen-containing atmosphere, preferably air, at a rate of 0.2° C. to 5° C./minute to a temperature greater 300° C., but below a temperature at which the crystallinity of the molecular sieve is adversely affected. Generally, such temperature will be in the range 400° C. to 1000° C., preferably below 600° C. Preferably the temperature of calcination is within the approximate range of 350° C. to 550° C. The product is maintained at the calcination temperature usually for 1 to 24 hours. A preferred calcination regime for the process of the present invention is as follows. After drying, the dry structured body may be calcined in a two-stage calcination procedure. In this two-stage procedure, the dried structured body is firstly calcined at a temperature in the range of 400° C. to 1000° C., preferably 400 to 600° C., most preferably 450 to 550° C., in an inert atmosphere, which is preferably flowing nitrogen. The preferred flow rate is within the range of 1 to 10 v/v/hr, preferably 2 to 8 v/v/hr and most preferably is a flow rate of 5 v/v/hr. The first stage is undertaken for between 1 to 24 hours, preferably 1 to 10 hours and most preferably for 2 hours. This first stage is then followed by a second calcination stage in an oxidizing atmosphere; preferably the oxidizing atmosphere is 100% air. The second stage is undertaken for a period of 1 to 24 hours, preferably 1 to 12 hours and most preferably for between 6 to 13 hours. The flow rate for the oxidizing gas is within the range of 1 to 10 v/v/hr, preferably 2 to 8 v/v/hr and most preferably is a flow rate of 5 v/v/hr. The temperature of the second stage is within the range 400° C. to 1000° C., preferably 400° C. to 600° C., most preferably 450° C. to 550° C. The switchover from the first stage to the second stage is gradual and is typically undertaken over a period of 1 to 10 hours, more preferably 1 to 5 hours and most preferably 2 to 4 hours.

One advantage of the structured bodies of the present invention is that good porosity and strength are obtained while eliminating the use of toxic and flammable solvents from such systems. Depending on the application, the structures of the present invention may exhibit a total porosity of 20-75%, preferably 20-60% by volume. Molecular sieves are generally known to retain their high surface area during firing. High porosity is also achieved because molecular sieves do not generally undergo excessive shrinkage during the calcination step. As a result, especially when molecular sieves are the particulate inorganic materials used the structured bodies of the present invention are well within the surface area requirements of many catalyst and catalyst support applications. Generally, such applications require substantial overall surface area of at least 20 m$^2$/g, preferably greater than 100 m$^2$/g, and most preferably greater than 150-200 m$^2$/g.m. Overall surface area in excess of 200 m$^2$/g is readily obtained in the structured bodies of the present invention due in part to the minimal firing shrinkage.

In addition to porosity and surface area, catalytic and filter applications require adequate compressive strength. The process of the present invention provides calcined structured bodies, especially those comprising molecular sieve that have comparable compressive strength to similar molecular sieve bodies manufactured with the use of organic solvents. In the case of MCM-41, extrudates the compressive strengths are considerably higher than those which have hitherto been seen using organic, solvent-based formulations. Methods for determining compressive strength are well known in the art. Typically a single pellet of extruded and calcined material is mounted in a holder and force is applied though an anvil that is mounted perpendicular to the axis of the extrudate. The force at the crushing point of the pellet is measured as the compressive strength. This is usually repeated for up to 25 pellets and the average reading taken as the compressive strength.

The structured bodies of the present invention, especially structured bodies comprising molecular sieve, find use as catalysts and/or catalyst supports and may be used in any of the following processes for the treatment of hydrocarbon and non-hydrocarbon materials.

The structured bodies of the present invention are useful as catalyst components for catalyzing the conversion of organic compounds, e.g., oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications," 36 *Chemical Industries*, pgs. 41-61 (1989), to which reference is made for a discussion of the factors affecting shape selectivity). Diffusional limitations are also minimized as a result of the very large pores in the present materials. For these reasons, the structured bodies of the present comprising molecular sieve are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the structured bodies of the present invention, especially those comprising molecular sieve, may be used as catalysts to catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g., molecular sizes of about 13 Angstroms or more. The structured bodies of the present invention are particularly useful for reactions in which the molecular weight of the feed is reduced to a lower value, i.e., to reactions involving cracking such as cracking or hydrocracking. Cracking may be conducted at a temperature of from about 200° C. to about 800° C., a pressure of from about atmospheric to about 100 psig, and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$, with a hydrogen/hydrocarbon molar ratio of from about 0.1 to about 100. Other hydroconversions for which the present structured bodies may be used include hydrogenation, hydrotreating, hydrodesulfurization, hydrodenitrogenation, hydrodemetallation, hydrodearomatization, hydroisomerization, hydrofinishing and hydrodewaxing. The reaction conditions and catalysts for the hydroconversion reactions listed above are known in the art and are described in standard reference works such as J. H. Gary and G. E. Handwerk, "Petroleum Refining: Technology and Economics," 3rd Ed., M. Dekker, New York, (1994). In general, the structured bodies used as catalysts may be loaded with at least one metal preferably from Groups IVB, VIB, VIII or mixtures thereof. The metal(s) selected will depend on the particular hydroconversion reaction desired. Hydroconversion reaction conditions may range from milder (e.g., hydrofinishing) to more severe (e.g., hydrotreating) and generally encompass temperatures of from 150 to 500° C., pressures of from 50 to 3000 psig (446 to 20786 kPa), liquid hourly space velocities of from 0.1 to 20, and hydrogen treat gas rates of 100 to 10,000 scf/B (17.8 to 1780 m$^3$/m$^3$).

The structured bodies of the present invention may also be used for selective conversion of inorganic compounds such as oxides of nitrogen in mixtures of gases which contain nitrogen oxides ($NO_x$), for example, industrial exhaust gases, and the gases formed during the oxidative regeneration of catalysts used in the processing of hydrocarbons, especially in catalytic cracking operations.

When present in the structured bodies of the present invention, porous crystalline molecular sieves are preferably at least partly in the hydrogen form, but it may advantageously contain a minor amount of a metal, especially a noble metal as a catalytic component, especially a metal of Periods 5 and 6 of Group VIIIA of the Periodic Table, especially platinum, palladium, ruthenium, rhodium, iridium or mixtures thereof. Amounts of noble metal up to about 1 weight percent are typical with lower amounts, e.g., up to about 0.1 or 0.5 weight percent being preferred. Other preferred metals are non-noble metals of Groups IVB to VIB and Group VIII, including metals such as Ti, Cr, Mo, W, Fe, Co and Ni.

The $NO_x$ reduction is suitably conducted by passing the gas containing the oxides of nitrogen over and/or through the structured bodies at an elevated temperature, typically at least 200° C., and usually within the range of 200 to 600° C. The gas mixture may be mixed with ammonia to promote reduction of the oxides of nitrogen and pre-mixing may be conducted at a temperature of up to about 200° C.

Because the structured bodies of the present invention, especially those comprising molecular sieve, have been found to be stable, their use as cracking catalysts, e.g., in fluid catalytic cracking processes with resid feeds, will represent an especially favorable mode of utilization. Still further, they may be used in combination with one or more other catalyst components such as, for example, cracking catalysts comprising silica-alumina and/or zeolite Y, e.g., USY.

The structured bodies of the present invention, and especially those comprising molecular sieve, are especially useful for reactions using high molecular weight, high boiling or non-distillable feeds, especially residual feeds, i.e., feeds which are essentially non-distillable or feeds which have an initial boiling point (5% point) above about 1050° F. Residual feeds which may be used with the present molecular sieve structures include feeds with API gravities below about 20, usually below 15 and typically from 5 to 10 with Conradsen Carbon Contents (CCR) of at least 1% by weight and more usually at least 5% or more, e.g., 5-10%. In some resid fractions, the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g., phenol or furfural extraction, deasphalted oils, slop oils and residual fractions from various processes such as lube production, coking and the like. High boiling fractions with which the present molecular sieve structures may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. Other examples of petroleum feeds include lighter feeds such as naphthas, including petroleum naphthas, steam cracked naphthas, FCC naphthas, coker naphthas and mixtures thereof and other light distillates such as diesel, jet, fuel oil and the like. The structured bodies of the present invention may also be utilized with feeds of non-petroleum origin, for example, synthetic oils produced by coal liquefaction, Fischer-Tropsch waxes and heavy fractions and other similar materials.

The structured bodies of the present invention, especially those comprising molecular sieve, may also be used as adsorbents and separation vehicles in pharmaceutical, biological and fine chemical applications. For example, structured bodies comprising ultra-large pore molecular sieve materials may be used in the purification of drugs like insulin or be used as solid vehicles for the controlled delivery of drugs. Another application for use of these structured bodies involves waste disposal where the extraordinary pore volumes are exploited. Therefore, at least one component can be partially or substantially totally separated from a mixture of components having differential sorption characteristics with respect to the structured bodies of the present invention comprising ultra-large pore molecular sieve, by contacting the mixture with the structured bodies to selectively adsorb or absorb the one component. Examples of this include contacting a mixture comprising water and at least one hydrocarbon component, whereby at least one hydrocarbon component is selectively sorbed. Another example includes selective sorption of at least one hydrocarbon component from a mixture comprising same and at least one additional hydrocarbon component. The structured bodies of the present invention may also be used as a host matrix for the immobilization of biomaterials such as enzymes.

It should be understood that the foregoing represent illustrative embodiments of the invention, and are not intended to embody all aspects of the invention. In addition to the above embodiments, it will be clear to persons skilled in the art that numerous modifications and changes can be made to the illustrative embodiments without departing from the intended spirit and scope of the invention.

To more fully illustrate the invention, the following non-limiting examples are presented. All parts, portions, and percentages are on a weight basis unless otherwise stated.

EXAMPLE 1

Comparative

About 80 wt. % USY zeolite (Si/Al$_2$ ratio of ~400) was placed in an Eirich mixer. The Dow Corning 6-2230 silicone resin (20 wt. % SiO$_2$ equivalent) was dissolved in dibasic ester (DBE) and added to the Eirich mixer to a final 50 wt. % solids. DBE is a mixture of three esters (Diisobutylglutarate/adipate/succinate) and is available from DuPont Co. This mixture was allowed to ball up into ¹⁄₁₆" to ⅛" spheres prior to extrusion. The extrusion was run with a ¹⁄₁₆" cylinder die plate and at 7.9 amps. The extrudate exiting the die was at ambient temperature was translucent and was easily deformable. The extrudate was dried at 250° F. overnight.

After drying, the dry extrudate was calcined in a two-stage procedure. Firstly, the extrudate was calcined at a temperature of 900° F. in an inert atmosphere of flowing nitrogen at a flow rate of 5 v/v/hr for 2 hours. This stage was followed by a second calcination stage in an oxidizing atmosphere of 100% air for between 6 to 13 hours at a flow rate of 5 v/v/hr and a temperature of 1000° F. The switchover from the first stage to the second stage is gradual and is typically undertaken over a period of 2 to 4 hours. The compressive strength after calcination was measured as 98 lb/in.

EXAMPLE 2

A mixture was prepared for extrusion by blending about 90 wt. % USY zeolite (Si/Al$_2$ ratio of ~400), and 10 wt. % SiO$_2$ equivalent of Dow Corning 6-2230 silicone resin, which had been milled to <30 US mesh, in an Eirich mixer for 5 minutes. Water was added to adjust the solids in the mixture to 49 wt. % and 1.5 wt. % polyvinylalcohol (PVA) was added as an extrusion aid. This mixture was allowed to ball up into 1/16" to 1/8" spheres prior to extrusion. The extrusion was run with a 1/16" cylinder die plate and at 9.5 amps. During the extrusion steam was given off and there was noticeable condensation on the outside surface of the die.

The extrudate was dried at 250° F. overnight and was then calcined using the procedure of Example 1. The compressive strength after calcination was measured as 85 lb/in. This Example illustrates that the organic, solvent-free system provides a calcined extrudate of high silica zeolite, which is comparable in strength to the solvent based system as exemplified by Example 1 (Comparative).

EXAMPLE 3

A mixture was prepared for extrusion by blending about 90 wt. % USY zeolite (Si/Al$_2$ ratio of ~400), and 10 wt. % SiO$_2$ equivalent of Dow Corning 6-2230 silicone resin (which had been milled to <30 US mesh), in an Eirich mixer for 5 minutes. Water was added to adjust the solids in the mixture to 54 wt. % and no PVA extrusion aid was added. This mixture was allowed to ball up into 1/16" to 1/8" spheres prior to extrusion. The extrusion was run with a 1/16" cylinder die plate and at 12.5 amps. During the extrusion heavy steam was given off and there was noticeable condensation on the outside surface of the die. The final extrusion temperature was ~80° C.

The extrudate was dried at 250° F. overnight and was then calcined using the procedure of Example 1. The compressive strength after calcination was measured as 81 lb/in.

EXAMPLE 4

Comparative

About 90 wt. % of surfactant containing MCM-41 was placed in an Eirich mixer. The Dow Corning 6-2230 silicone resin (10 wt. % SiO$_2$ equivalent) was dissolved in dibasic ester (DBE) and added to the Eirich mixer to a final 36 wt. % solids. DBE is a mixture of three esters (Diisobutylglutarate/adipate/succinate) and is available from DuPont. This mixture was allowed to ball up into 1/16" to 1/8" spheres prior to extrusion. The extrusion was run with a 1/16" cylinder die plate.

The extrudate was dried at 250° F. overnight and was then calcined using the procedure of Example 1. The compressive strength after calcination was measured as 27 lb/in.

EXAMPLE 5

A mixture was prepared for extrusion by blending about 90 wt. % of MCM-41 crystal that had been hybrid calcined, and 10 wt. % SiO$_2$ equivalent of Dow Corning 6-2230 silicone resin (which had been milled to <30 US mesh), in an Eirich mixer for 5 minutes. Water was added to adjust the solids in the mixture to 42 wt. % and 1.5 wt. % polyvinylalcohol was added as an extrusion aid. This mixture was allowed to ball up into 1/16" to 1/8" spheres prior to extrusion. The extrusion was run with a 1/16" cylinder die plate and at 11.5 amps. During the extrusion steam was given off and there was noticeable condensation on the outside surface of the die.

The extrudate was dried at 250° F. overnight and was then calcined using the procedure of Example 1. The compressive strength after calcination was measured as 54 lb/in. This Example illustrates that the organic solvent free system provides a calcined extrudate of MCM-41 which has considerably higher strength compared to the solvent based system as exemplified by Example 4 (Comparative).

EXAMPLE 6

A mixture was prepared for extrusion by blending about 90 wt. % ZSM-5 crystal in its sodium form, and 10 wt. % SiO$_2$ equivalent of Dow Corning 6-2230 silicone resin (which had been milled to <30 US mesh), in an Eirich mixer for 5 minutes. Water was added to adjust the solids in the mixture to 56 wt. % and 1.5 wt. % (PVA) was added as an extrusion aid. This mixture was allowed to ball up into 1/16" to 1/8" spheres prior to extrusion. The extrusion was run with a 1/16" cylinder die plate and at 11.5 amps. The temperature of the extrudate was measured at 58° C. and during the extrusion steam was given off and there was noticeable condensation on the outside surface of the die.

The extrudate was dried at 250° F. overnight and was then calcined using the procedure of Example 1. The compressive strength of the green extrudate was measured at 37 lb/in and the compressive strength after calcination was measured as 91 lb/in.

EXAMPLE 7

A mixture was prepared for extrusion by blending about 90 wt. % ZSM-35 with template, and 10 wt. % SiO$_2$ equivalent of Dow Corning 6-2230 silicone resin (which had been milled to <30 US mesh), in an Eirich mixer for 5 minutes. Water was added to adjust the solids in the mixture to 49 wt. % and 1.5 wt. % PVA was added as an extrusion aid. This mixture was allowed to ball up into 1/16" to 1/8" spheres prior to extrusion. The extrusion was run with a 1/16" cylinder die plate and at 9.5 amps. During the extrusion steam was given off and there was noticeable condensation on the outside surface of the die.

The extrudate was dried at 250° F. overnight and was then calcined using the procedure of Example 1. The compressive strength after calcination was measured as 39 lb/in.

EXAMPLE 8

A mixture was prepared for extrusion by blending about 80 wt. % ZSM-5 crystal with 10% particulate silica as diluent (Ultrasil-PM), and 10 wt. % SiO$_2$ equivalent of Dow Corning 6-2230 silicone resin (which had been milled to <30 US mesh), in an Eirich mixer. De-ionized water was added to adjust the solids in the mixture to 56 wt. % and 2 wt. % of PVA was added as an extrusion aid. This mixture was mixed in the Eirich mixer until an extrudable paste was obtained. The extrusion was run with a 1/16" cylinder die plate to produce 1/16" cylindrical extrudates. The extrudate was dried and was then calcined at 1000° F. using the procedure of Example 1. The compressive strength after calcination was measured as 61 lb/in.

Attempts to extrude this particular ZSM-5 zeolite material using the procedure of U.S. Pat. No. 4,582,815 with caustic and Ludox silica, failed to produce any extrudates, as the mixture was not extrudable.

It should be understood that while the present invention has been described in detail with respect to certain illustrative and specific embodiments thereof, it should not be considered limited to such but may be used in other ways without departing from the spirit of the invention and the scope of the appended claims.

The invention claimed is:

1. A process for the manufacture of a structured body which process comprises
   (a) preparing a batch composition free of added organic solvent comprising mixing
      (i) at least one molecular sieve,
      (ii) at least one particulate silicone resin having an average particle size of about 25 to about 450 μm, wherein the amount of molecular sieve is about 90 to about 99.5 wt. % and the amount of silicone reisn is about 0.5 to about 10 wt. %, based on the total weight of the molecular sieve plus silicone resin, and
      (iii) water, and
   (b) forming the batch composition into a structured body.

2. The process of claim 1 wherein in a further step after step (b), the structured body is subjected to at least one of drying or calcining.

3. The process of claim 1 wherein in step (b), the forming is achieved by at least one extrusion or compression molding.

4. The process of claim 1 wherein the batch composition further comprises an extrusion aid.

5. The process of claim 4 wherein the extrusion aid is present in an amount of from about 0.1 to about 15% by weight, based on extrudate, and is selected from at least one of polyvinyl alcohol or polyvinylpyrrolidone.

6. The process of claim 1 wherein the silicone resin has at least one of the following properties: (a) a silicon oxide content of at least about 50% by weight, based on resin; (b) a degree of crosslinking of about 1.5 or less; (c) a weight average molecular weight of from about 1000 to 10,000; d) a silanol content of at least about 3 wt. %, based on resin; and (e) an average particle size from about 0.01 to about 700 μm.

7. The process of claim 1 wherein the silicone resin is a polysiloxane having at least one of alkyl, aryl or glycol groups.

8. The process of claim 1 wherein the amount of water is that sufficient to make the mixture of molecular sieve and silicon resin extrudate.

9. The process of claim 1 wherein the at least one molecular sieve is a zeolite, silicate, metallosilicate, metalloaluminate, silicoaluminophosphate, metalloaluminophosphate or aluminophoshate.

10. The process of claim 9 wherein the molecular sieve contains at least one metal.

\* \* \* \* \*